Feb. 10, 1931.  B. M. SHIPLEY  1,791,845

CASH REGISTER

Filed Aug. 22, 1924  6 Sheets-Sheet 1

Inventor
Bernis M. Shipley
By Carl Benst
Henry Stauffer
His Attorneys

Feb. 10, 1931.    B. M. SHIPLEY    1,791,845
CASH REGISTER
Filed Aug. 22, 1924    6 Sheets-Sheet 2

Inventor
Bernis M. Shipley
By Carl Beust
Henry E Stauffer
His Attorneys

Feb. 10, 1931.   B. M. SHIPLEY   1,791,845
CASH REGISTER
Filed Aug. 22, 1924   6 Sheets-Sheet 3

Inventor
Bernis M. Shipley
By Carl Berist
Henry E Stauffer
His Attorneys

Feb. 10, 1931. B. M. SHIPLEY 1,791,845
CASH REGISTER
Filed Aug. 22, 1924   6 Sheets-Sheet 4

Inventor
Bernis M. Shipley
By Earl Beust
Henry E. Stauffer
His Attorneys

Patented Feb. 10, 1931

1,791,845

UNITED STATES PATENT OFFICE

BERNIS M. SHIPLEY, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed August 22, 1924. Serial No. 733,572.

This invention relates to cash registers, and more particularly to the transfer mechanism thereof.

One of the objects of this invention is to construct a cash register using ten toothed totalizer wheels and actuating segments with transfer mechanism adapted to correctly register the English monetary system.

A specific object of this invention is to provide means for transferring from the tens of pence totalizer wheel to the units of shillings totalizer wheel, and means for subtracting two units from the units of pence totalizer wheel when the transfer to the units of shillings totalizer wheel is effected, to correct the reading of the total on the totalizer.

Another object of the invention is to provide a means for deducting "2" from the units of pence wheel when the units of pence wheel passes from "1" to "2" and the tens of pence wheel is standing at "1".

A still further object of the invention is to provide means for giving the units of pence actuating mechanism two independent excursions, one for adding amounts under control of the amount keys, and another for deducting "2" from the units of pence wheel whenever a transfer is effected into the units of shillings totalizer wheel.

A further object of this invention is to provide means for controlling the zero stop pawl in the units of pence bank, whereby said zero stop pawl is rocked into its ineffective position during one excursion of a totalizer actuator, which actuator is adapted to receive two excursions during each cycle of operation of the machine.

A further object of this invention is to provide means to prevent a transfer from being entered into the tens of pence totalizer wheel when the units of pence totalizer wheel passes from "0" to "9" during the backward rotation thereof, while correcting the amount thereon when "one" is transferred to the units of shillings totalizer wheel.

Still another object of the invention is to provide a stopping means for preventing two units from being reentered into the units of pence totalizer element when the two units have been deducted therefrom, after a transfer has been effected into the units of shillings totalizer elements.

With these and incidental objects in view, the invention includes certain novel features of construction and combinations of parts, the essential elements of which are set forth in appended claims and a preferred form of embodiment of which is hereinafter described with reference to the drawings which accompany and form part of this specification.

General description

This invention is embodied in a machine of the type shown and described in the U. S. patents to F. L. Fuller numbered 1,242,170 and 1,394,256, issued on October 9, 1917, and October 18, 1921, respectively, and therefore only such parts of the machine as are thought to be necessary to a clear understanding of this mechanism are shown in this application. If any further description is desired reference may be had to the above mentioned patents.

As above noted, one of the objects of this invention is to adapt a machine, such as that shown in the Fuller patents, for use in connection with English currency. Machines of this type are constructed with totalizer wheels having ten teeth and actuating segments also having ten teeth, and therefore in order to accomplish the above mentioned object it was necessary to provide special transfer mechanism.

There are four farthings in a penny, and therefore the machine is constructed with the farthing totalizer wheel having two sets of teeth, each set consisting of three ordinary teeth and two long teeth. When an amount is added to the farthing totalizer wheel, which necessitates a transfer to the units of pence bank, the long tooth in the fourth position trips a transfer lever in a manner well known in the art, and causes "1" to be added to the units of pence totalizer wheel. Since the farthing wheel has two long teeth it is also necessary on this operation, to add "1" to the farthing totalizer wheel itself, in order that the second long tooth may be moved one step and the totalizer wheel left standing in its "0" position, ready for an addition thereto.

The transfer from the units of pence to the tens of pence totalizer wheels also requires special mechanism. As there are twelve pence in a shilling, it can be seen that there are two transfers required in this particular bank. The first transfer will be made as the units of pence totalizer wheel passes from "9" to "0". The units of pence totalizer wheel carries a long tooth in the "0" position which trips transfer mechanism which will be later described. This first transfer will add "1" to the tens of pence totalizer wheel, which has five sets of two positions thereon, these being "0" in which there is a long tooth and "1" which is a short tooth. The second transfer occurs when the units of pence totalizer wheel passes from "1" to "2", with the tens of pence wheel standing at 1. When this occurs "1" will be transferred to the tens of pence totalizer wheel, returning this wheel to zero, and "1" will also be transferred to the units of shillings totalizer wheel. When this latter transfer has been accomplished, however, the units of pence totalizer wheel will show two units more than it should, and therefore mechanism is also provided to remove "2" from the units of pence totalizer wheel whenever "1" is transferred to the shilling totalizer wheel.

Keyboard

Figure 1:
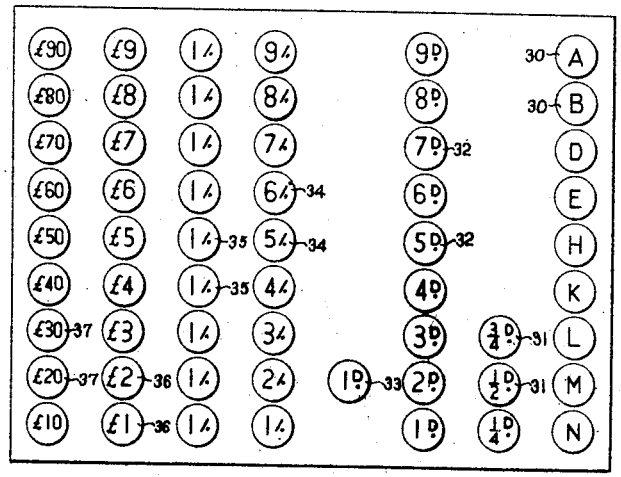
Fig. 1 is a diagrammatic view of the keyboard best adapted for use with the present invention.
Figure 3:
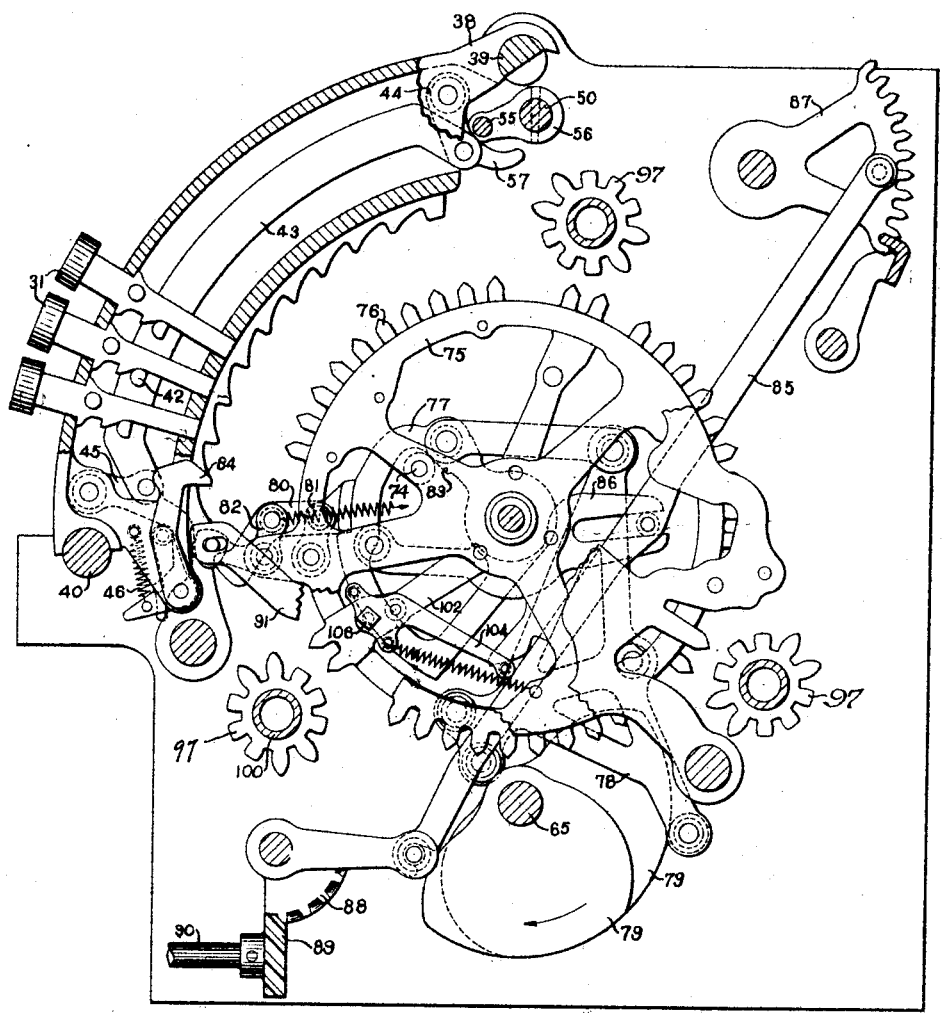
Fig. 3 is a section through the machine taken just to the right of the farthing, or quarter pence, bank.
Figure 5:
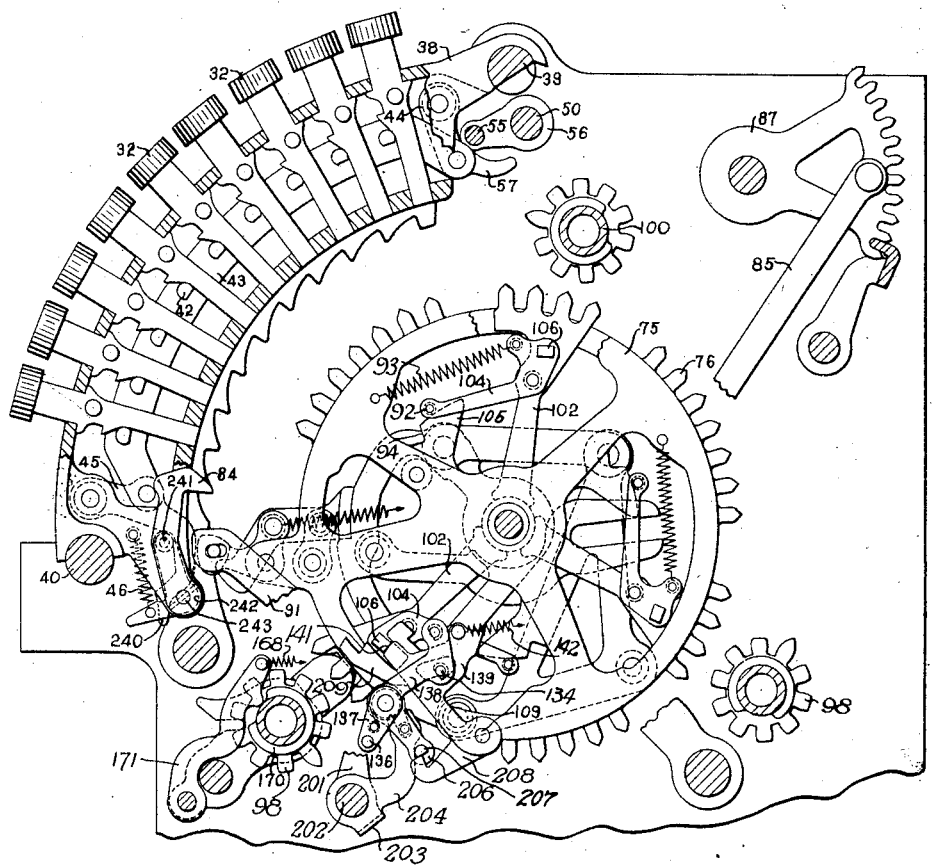
Fig. 5 is a section through the machine taken just to the right of the units of pence bank of keys.
Figure 10:
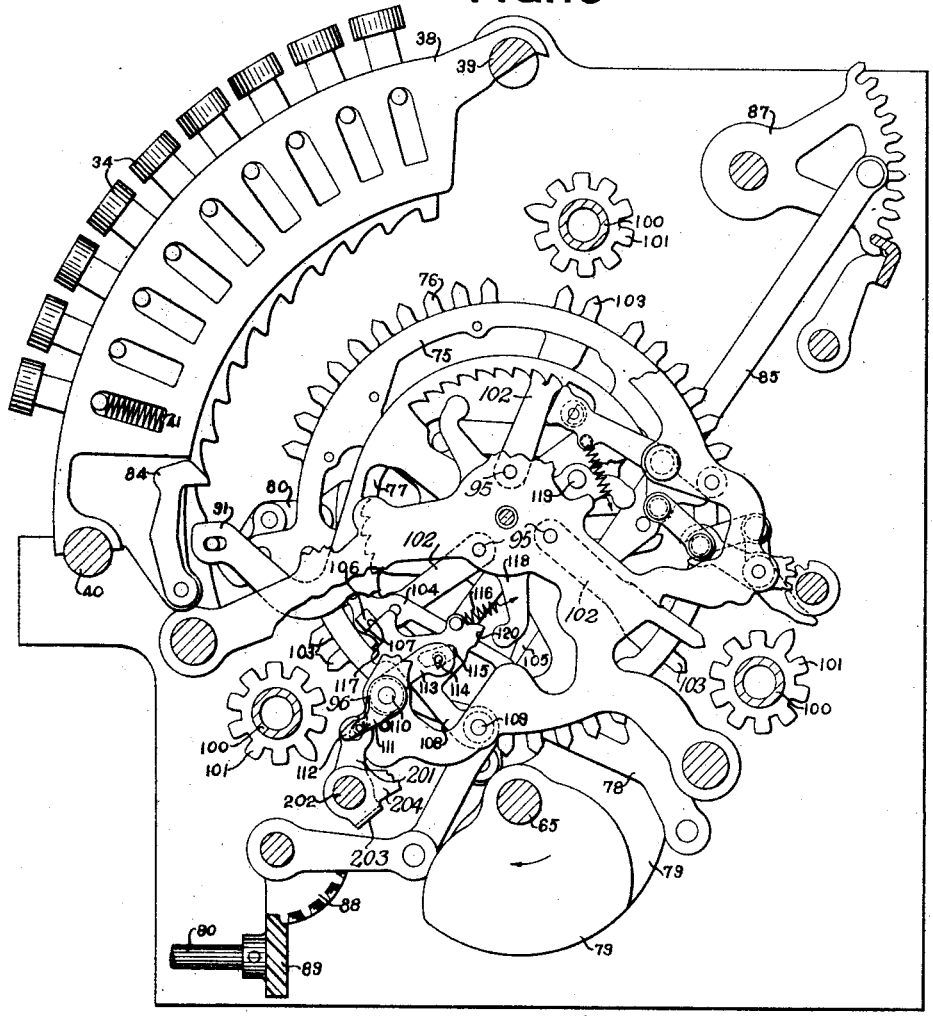
Fig. 10 is a section taken through the machine just to the right of the units of shillings bank.

The keyboard includes a bank of clerks' keys 30 (Fig. 1), which are on the extreme right of the keyboard. The next bank toward the left is the farthing, or quarter penny, bank. This bank has three keys 31 (Figs. 1 and 3). The next bank to the left is the units of pence bank, which contains nine keys 32 (Figs. 1 and 5). The next bank is the tens of pence bank, which has only one key 33, shown in Figs. 1 and 7. Proceeding toward the left, the next bank is the units of shillings bank, which has nine keys 34 (Figs. 1 and 10). The next bank to the left is the tens of shillings bank and, as there are twenty shillings in a pound, all of the keys 35 in this bank are numbered "1". The complete complement of nine keys is used in this bank merely for the sake of convenience in operating the machine. There are two other banks in the keyboard, as shown, these being the units of pounds keys 36 and the tens of pounds keys 37. These banks of keys, and the mechanisms cooperating therewith, are exactly the same as those shown and described in the above mentioned patents, and therefore no description whatever of these banks of keys will be included herein.

The keys in all of the above mentioned banks are similarly mounted, and therefore a description of one of the banks is thought to be sufficient. The keys 32 (Fig. 5), in the units of pence bank, are slidably mounted in a key frame 38, supported at its upper end by a rod 39, and at its lower end by a rod 40, both of which are mounted in the machine side frames. The keys are normally maintained in their undepressed positions by coiled springs 41 (Fig. 7) which cooperate with pins carried by the keys. When a key is depressed it is held in its depressed position by a pin 42 (Fig. 5) carried by a detent 43, pivoted to an arm 44 at its upper end, and to an arm 45 at its lower end, these arms being carried by the key frame 38. Each of the keys has a shoulder projecting from its stem which, when the key is depressed, will force the detent 43 downwardly until the pin 42 thereon, appropriate to the key depressed, passes the shoulder on the key, whereupon the detent will move upwardly under the action of a spring 46 and latch the key in its depressed position.

After the proper keys have been depressed, the machine is released by the depression of one of the clerks' keys, or by a motor bar which is not shown herein. A shaft 50, supported by the machine side frames normally tends to rock in a clockwise direction (Figs. 2 and 5) due to a spring 51 compressed between two spring pilots 52 and a link 53. The spring pilots 52 are pivoted to the end of a lever 54 fastened to the shaft 50 so that when the machine is released the spring 51, through the lever 54, will rock the shaft in a clockwise direction. Near the end of the operation of the machine the shaft 50 is rocked counter-clockwise past its normal position a sufficient distance to cause a rod 55 (Figs. 3 and 5), carried by a plurality of arms 56, to cooperate with a tail 57 on the arm 44 which supports the upper end of each of the detents 43. As the rod 55 contacts the tails 57 the detents 43 are moved downwardly far enough to disengage the pins 42 thereon from the shoulders of the depressed keys thus permitting the springs 41 to move the keys to their normal undepressed positions.

The means for rocking the lever 54 and shaft 50 counter-clockwise to release the keys is well known, and is illustrated and described in the previously mentioned Fuller patents. A brief description only thereof will be given. The link 53 has an opening 58 therein through which a pin 59 carried by an arm 60 projects. The arm 60 also carries a roller 61 extending into a cam groove 62 formed in the side of a gear 63 pivoted on the right hand side frame of the machine. This gear meshes with a gear 64 fastened to the right hand end of a main drive shaft 65, which receives one complete clockwise rotation (Fig. 2) on every operation of the machine. The ratio of these gears 63 and 64 is such that a complete rotation of the gear 64 will give the gear 63 a one-half rotation. The formation of the cam groove 62 is such that upon each one-half rotation of the gear 63 the arm 60 will be rocked first clockwise, and then counter-clockwise. On the clockwise movement of the arm 60 the pin 59 will contact a shoulder 66 formed in the opening 58 of the link 53 and will thereby lower the link 53 a sufficient distance to rock the arm 54 and shaft 50 to release the depressed keys in the manner above described. After the clockwise movement of the arm 60 there occurs a dwell 67 in the cam slot 62. This dwell restrains the arm 60, link 53, shaft 54 and the key detents 43, to hold the zero stop pawls 84 out of their effective positions long enough to permit the differentially movable actuator 75 for the units of pence bank to receive a second upward movement, the purpose of which will be later described.

Differential mechanism

The differential mechanism used in the present machine is of the same type as that shown and described in the above mentioned patents, and it will, therefore, be only briefly described in this application. The differential mechanism includes a plurality of differential units, one for each bank of keys. As these units are substantially the same, with the exception of minor differences, the description of one will apply to all, and similar parts will be given the same reference characters in all figures.

Cooperating with the amount keys is a differentially movable actuator 75 (Fig. 3), having racks 76 adapted to operate the totalizers. This actuator 75 is driven in a clockwise direction by a driving segment 77 given a constant excursion on every operation by a Y-shaped lever 78 and a pair of cams 79 secured to the main drive shaft 65. The differentially movable actuator 75 is latched to the driving segment 77 on its clockwise movement by a latch 80 carried by a link 81 and a bell crank lever 82 supported by said differentially movable actuator 75.

The connection between the actuator 75 and the driving segment 77 is broken when the bell crank lever 82 comes into contact with the inner end of the depressed key. The differentially movable actuator is returned to its home position on every operation by the engagement of a surface 83 of the segment 77 with a pin 74 on said actuator 75.

A zero stop pawl 84 is provided to disconnect the latch 80 in the zero position when no key in a bank is depressed. This pawl is moved to ineffective position by the depression of a key. The stop pawl lies in the path of an arm 91 (Fig. 10) which actuates the bell crank lever 82 through a slot and pin connection.

The differential movement of the actuator 75 is transmitted to a link 85 by a beam 86 connected to the actuator 75 and is positioned by a roller on the Y-shaped lever 78. The movement of the link 85 is utilized to position appropriate printing wheels by means of a spiral segment 88 (Fig. 10) and a spiral gear 89 fast on a shaft 90, in a manner which is well known in machines of this class. The printer is not shown in this application as it is not necessary for an understanding of the invention.

Totalizers

The totalizers used in the present machine are, with a few exceptions, which will be specifically pointed out later, similar to those described in the above referred to patents. They are of the sliding interspersed type. A brief description, therefore, it is thought will be sufficient herein. There are three totalizer lines 100 (Figs. 3, 4, 5, 7, 8, 9, 10 and 11) cooperating with the differential mechanism. Each of these totalizer lines consists of a plurality of totalizer elements arranged in groups, all the elements of one denomination being located in the same group, that is, all the farthings wheels 97 are together, all of the units of pence totalizer wheels 98 are together, all the tens of pence totalizer wheels 99 are together, all of the units of shillings wheels 101 are together, and so on.

In order to select any totalizer for operation, the whole line is slid endwise to bring the desired element in each group opposite its differentially movable actuator, as shown and described in the Fuller patents above mentioned. When the three totalizer lines have been so positioned they are moved into engagement with the differentially movable actuators in order that the wheels may be rotated to the proper extent corresponding to the amounts on the depressed keys. Either one, two, or all three lines, may be engaged and actuated simultaneously if desired.

*Normal transfer mechanism*

As this invention has particularly to do with transfer mechanism and, as the novel mechanism herein is, in part, a variation of the transfer mechanism previously known and used in connection with machines of this type, it is believed that it will facilitate the description of these devices if the normal transfer mechanism is first described. The normal transfer mechanism is used to transfer from the tens of pence totalizer wheels 99 to the units of shillings totalizer wheels 101, and this mechanism will now be described.

Pivotally mounted, at points 95, on the differentially movable actuator 75 (Fig. 10) are three transfer arms 102 each having two teeth 103 like the teeth of the racks 76. These arms are in the same plane as the racks. The transfer tripping mechanisms associated with these arms 102 for the three totalizer lines are identically the same and, therefore, the tripping mechanism for the front line only will be described. This description will apply equally well to the upper and back totalizer lines. Pivoted to the arm 102 are two levers 104 (Figs. 5 and 10) on each side of the arm 102. Only one lever 104 shows because they are identical in outline. These levers 104 are connected by a pin 92 held in contact with a projection 105 of the actuator 75, by a spring 93. During the clockwise movement of the differentially movable actuator 75 this spring 93 shifts the lever 104 to such a position that the pin 92 is moved into a recess 94 formed in the projection 105 so that the arm 102 and the rack 76 appropriate thereto move as a unit. One of the levers 104 has secured thereto a squared stud 106 which abuts a surface 107 (Fig. 10), of a stop arm 108 mounted on a stud 109 on the supporting frame for the differential unit, when the rack 76 arrives at "0". This rack 76 is normally given slightly less than two units of movement counter-clockwise beyond "0" to its home position, and consequently the abutment of the stud 106 with the surface 107 of the stop arm 108 causes the levers 104 to be rocked slightly in a clockwise direction, whereby the pin 92 carried thereby becomes disengaged from the recess 94 in the projection 105, and therefore the differentially movable actuator moves slightly less than two steps farther than the arm 102.

Figure 7:
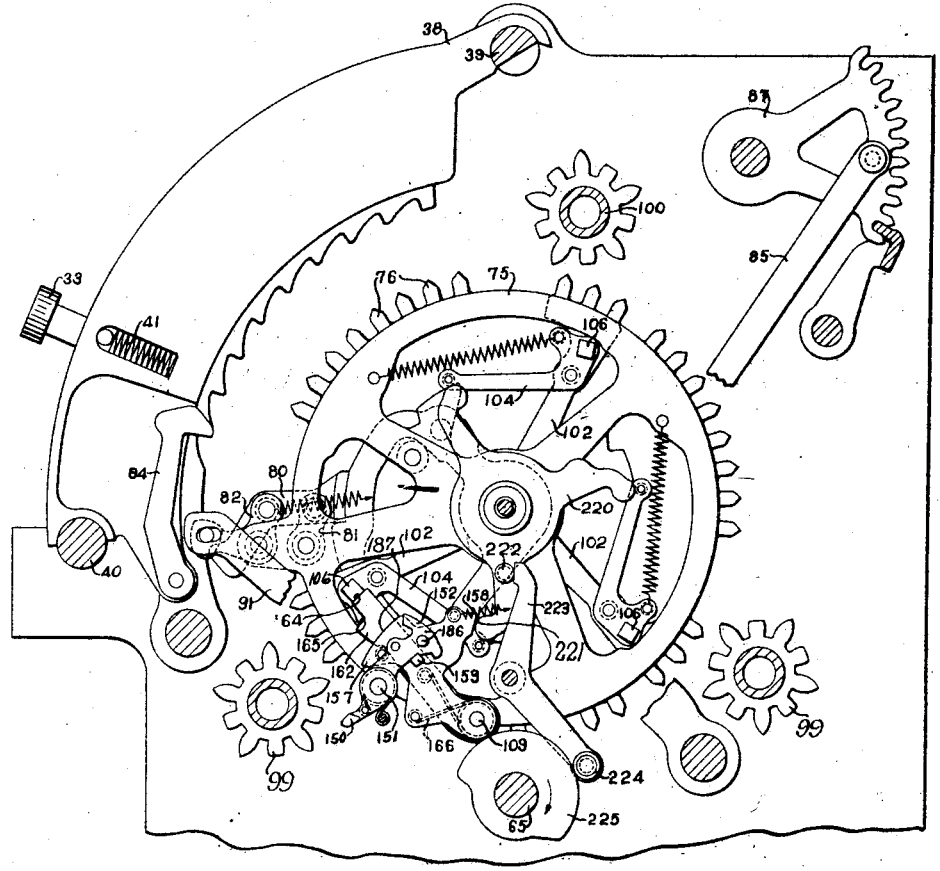
Fig. 7 is a section through the machine taken just to the right of the tens of pence bank.
Figure 8:
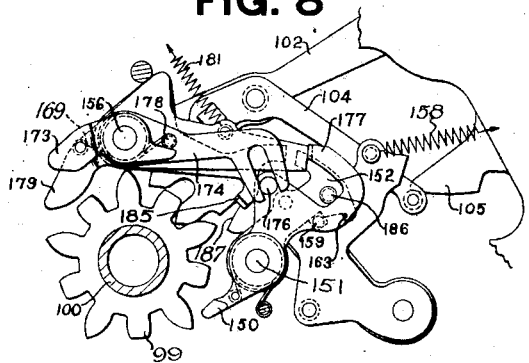
Fig. 8 is a detail side elevation of a portion of the transfer mechanism used in connection with the tens of pence bank.
Figure 9:
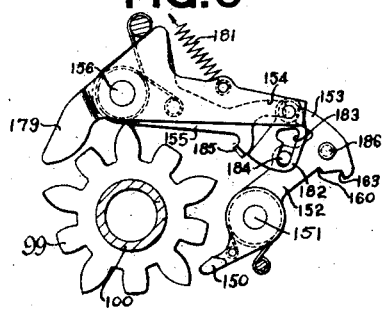
Fig. 9 is a detail side elevation showing the special transfer trip lever operated by the tens of pence totalizer wheel.

Secured to a short shaft 110 (Fig. 10), supported by the differential unit frame is an arm 111 having a projection 112 which normally lies in the path of one of a plurality of long teeth on the tens of pence totalizer wheel 99 (Fig. 7). Also fast on the shaft 110 (Fig. 10) is an arm 113 carrying a flattened pin 114 held in engagement with a shoulder in an opening 115 in the transfer stop arm 108 by a torsion spring 96.

As the tens of pence totalizer wheel 99 rotates, one of the long teeth thereon engages the projection 112 of arm 111 and rocks this arm counter-clockwise (Fig. 10). This movement disengages the pin 114 from the shoulder in the opening 115, and a spring 116 rocks the lever 108 clockwise and moves the surface 107 thereof out of the path of the squared stud 106. This brings a shoulder 117 into the path of movement of the stud 106 to regulate the movement of the arm 102. When this occurs, the arm 102 remains locked to the rack 76 during the first extra unit of movement past the zero position which said rack receives thereby causing "1" to be added upon the units of shillings totalizer wheel 101.

All displaced transfer devices are restored to normal positions at the next operation of the machine by a three armed lever 118 pivoted on the hub of the differentially movable actuator. This lever 118 carries a pin 119 which is engaged by a surface of the segment 77 in the next lower bank near the end of the clockwise movement of this segment. When the pin is thus engaged by the segment, the three armed lever 118 engages edges 120 of the transfer stop arms 108 and rocks these arms counter-clockwise until the pin 114 associated with each arm 108 is again in position to be moved into engagement with the shoulder in the opening 115. When the pin 114 is in this latter position the transfer trip arms 111 are restored to their normal positions by the torsion springs 99.

*Transfer from farthing bank to units of pence bank*

Figure 4:
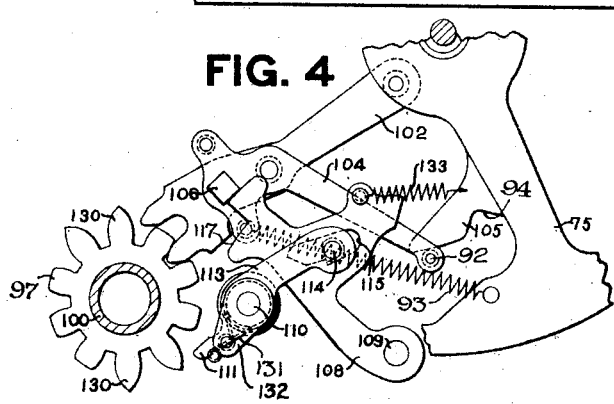
Fig. 4 is a detail side elevation of one of the farthing totalizer wheels, and the transfer mechanism which cooperates therewith.

As there are four farthings in a penny it is apparent that when a farthing totalizer wheel 97 passes from 3 to 4 it is necessary to transfer "1" to the units of pence totalizer wheel. A ten toothed wheel 97 is used to register the farthings, and this wheel is constructed as shown in Figs. 3 and 4 and is provided with three ordinary teeth, then two long teeth, then three ordinary teeth, and then finally two more long teeth, thus making two complete sections to register farthings. The long teeth 130 (Fig. 4) are the ones which control the transfer mechanism. When this wheel 97 passes from "3" to "4", since a ten toothed wheel is used, it is necessary to give this wheel one extra step of movement in order to skip the idle tooth thereon and turn the wheel to the zero position of the next section. In other words, means are provided for not only transferring "1" to the units of pence totalizer wheel 98 when the farthings wheel passes from "3" to "4", but also means for simultaneously giving the farthings wheel 97 an extra step of movement at this point in order to bring the next section of effective teeth into operative position. The mechanism for accomplishing this function is similar to that shown in Letters Patent of the United States, No. 1,730,094, issued to B. M. Shipley, on October 1, 1929 (see Fig. 6 of that patent), and this mechanism will now be described. It may be stated here that many of the parts used in this mechanism are identical with parts above described in relation to the shillings bank, and hereafter in this description all similar parts will be given identical reference characters, regardless of the bank in which they are used.

Figure 6:
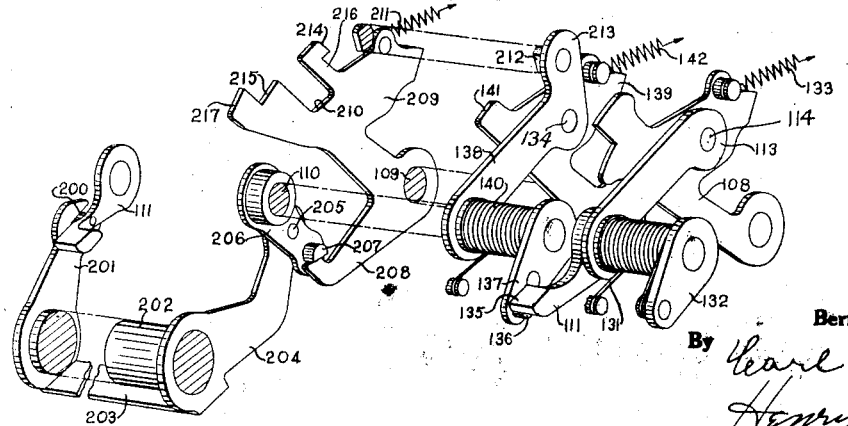
Fig. 6 is a detail extended perspective view of a portion of the transfer mechanism for the farthing and units of pence banks, together with a portion of the mechanism for deducting "2" from the units of pence totalizer wheel when "1" is transferred to the units of shillings totalizer wheel.

The four long teeth of the farthings totalizer wheel 97 (Figs. 3 and 4) are adapted to be engaged by the transfer trip arm 111 appropriate to this bank. This farthing trip arm, as seen in Figs. 4 and 6, is practically the same as the one shown in connection with the shillings bank, except for the fact that it is placed at the opposite end of the short shaft 110 in the farthings bank. Also fast on the shaft 110 is an arm 113 which carries a pin 114 normally engaging the shoulder formed in the opening 115 of the transfer stop arm 108 appropriate to this bank. The pin 114 is maintained in engagement with said shoulder by a torsion spring 131 wrapped about the shaft 110 and anchored at its right hand end to a pin carried by an arm 132 fast on this shaft, and at its left hand end to a pin in the differential unit supporting frame for this bank.

With the parts in their normal positions, the stop arm 108 (Fig. 4) lies in the path of the squared stud 106 carried by the lever 104 pivoted to the transfer arm 102, and therefore this arm will be stopped as the differentially movable actuator, for the farthing bank, returns to its home position, and the teeth carried by the arm 102 will not actuate the farthings wheel. Whenever the farthings wheel 97 passes from "3" to "4", and one of the long teeth thereof engages and trips the transfer trip arm 111, the pin 114 is disengaged from the shoulder in the opening 115 of the transfer stop arm 108, and this arm is rocked clockwise (Fig. 4) under the influence of a spring 133 and removes the end of the stop arm from the path of the squared stud 106 and positions the shoulder 117 thereof in the path of this stud, thereby permitting the transfer arm 102 to remain locked to the rack 76. Thus, when the farthings differentially movable actuator 75 (Fig. 3) is rotated counter-clockwise to its normal position, the transfer arm 102 remains locked thereto, and the teeth of the arm will rotate the farthings wheel 97, in engagement therewith, one step of movement, thereby bringing the wheel into its zero position, ready for further addition.

In addition to moving the farthings totalizer wheel 97 an extra step to move it to one of its two zero positions, the above described transfer operation also causes the units of pence totalizer wheel 98 (Fig. 5) to receive one step of movement in the following manner. The transfer trip arm 111 for the farthings bank has a laterally extending lug 135, (Fig. 6), which normally extends above a pin 136 carried by an arm 137 fast on the right hand end (Fig. 6) of the shaft 110 for the units of pence bank. Also fast on this shaft is an arm 138 (Figs. 5 and 6) which carries a pin 134 projecting through an opening in a transfer stop arm 139 somewhat similar to the stop arms 108 above described. The pin 134 on the arm 138 is normally held in engagement with a shoulder in the opening in the stop arm 139 by a torsion spring 140 (Fig. 6) wrapped about the shaft 110. In Fig. 5 the parts for the units of pence bank are shown in their normal positions. As the differentially movable actuator 75 for this bank is given its counter-clockwise rotation to its normal position the squared stud 106 for this bank comes into contact with the upper surface 141 of the stop arm 139 and therefore the lever 104 on the transfer arm 102 for this bank is rocked to unlock said transfer arm 102 from the differentially movable actuator 75 and holds said arm 102. The teeth on the arm 102 for this bank will not move the totalizer wheel 98. When, however, the farthings totalizer wheel 97 passes from "3" to "4", and the transfer trip arm 111 thereof is rocked as above described, the lug 135 of the trip arm 111 engages the pin 136 and rocks the arm 137, shaft 110 and arm 138 counter-clockwise (Figs. 5 and 6) and removes the pin 134 carried by the arm 138, from the shoulder in the opening in the stop arm 139. A suitable spring 142 is connected to the stop arm 139 and, when the above operation takes place, this spring will rock the stop arm 139 clockwise a sufficient distance to remove the surface 141 thereof from the path of the squared stud 106 on the arm 102 for this bank, thereby permitting said transfer arm to remain locked to the differentially movable actuator until the stud 106 contacts the bottom of a slot 210 in a lever 209 to be hereinafter described. This operation will add "1" to the units of pence totalizer wheel 98 (Fig. 5) which is being actuated.

It will be noted that the differentially movable actuator 75 for this bank has only seven teeth in each rack 76, and that there are four teeth on each of the transfer arms 102 in this bank. When the transfer arms are locked to the racks there are ten effective teeth. When no transfer is to take place, the transfer arm 102 (Fig. 5), having the four teeth, remains locked to the differentially movable actuator, until the squared stud 106 engages the surface 141. The position of the transfer arm 102 after an operation during which no transfer takes place, is shown in Fig. 5. It will be noticed (see the arm 102 for the upper totalizer line) that three teeth of the transfer arm 102 have moved for enough to cause three units to be added into the totalizer. Thus when "9" is added, the rack 76 effects the addition of "6" and the transfer arms 102 effect the addition of "3". One of the seven teeth of the rack 76 never effects addition, it being used merely for an aligner for the totalizer elements while the totalizer is being engaged with the rack, when the rack is set to add "9". The reason for providing the transfer arm for the units of pence bank with four teeth, and the rack 76 with only seven teeth, will be described hereinafter.

*Transfer from units of pence totalizer wheel to tens of pence totalizer wheel*

The units of pence totalizer wheel 98 (Fig. 5) effects two distinct transfers. The first of these takes place as the units of pence totalizer wheel 98 passes from "9" to "0". When this occurs "1" is transferred to the tens of pence totalizer wheel 99 (Fig. 7). The second transfer takes place to add "one" into the tens of pence wheel 99 when the units of pence wheel 98 passes from "1" to "2" at a time when the tens of pence wheel 99 stands with "1" thereon. The first of these two transfers will now be described. The units of pence totalizer wheels 98 are the standard totalizer wheels used in machines of this class, having nine ordinary teeth and one long tooth in the zero position. As the racks 76 in the units of pence bank are rotated counterclockwise, this totalizer wheel 98 is driven in an adding direction. As the wheel 98 passes from "9" to "0" the long tooth thereon contacts with and trips a transfer trip arm 150 (Figs. 7, 8, 9 and 11) secured to a shaft 151 which is identical with the shafts 110 previously described. Also fastened to the shaft 151 is an arm 152, having a head 153 in the same plane as a projection 154 of an arm 155 pivoted on a shaft 156 carried by the differential supporting frame for the tens of pence bank. Also pivoted to the differential supporting frame for this bank is a transfer stop arm 157 which normally tends to rock in a clockwise direction under the influence of a spring 158 (Fig. 11), but which is normally prevented from movement due to the engagement of a squared stud 159 projecting laterally therefrom with a shoulder 160 formed on the under side of the arm 152. The stop arm 157 carries a laterally projecting pin 161 which extends beneath and supports a second stop arm 162 which lies along side the stop arm 157. A torsion spring 166 (Fig. 7) flexibly holds the stop arm 162 in contact with the pin 161. The reason for this flexible connection will be described later.

When the units of pence totalizer wheel 98 (Fig. 11) passes from "9" to "0" the long tooth thereon trips the transfer trip arm 150. This movement, through the shaft 151, causes the arm 152 to move counter-clockwise until the head 153 thereof comes into contact with the projection 154 of the arm 155 which lies in its path. This movement of the arm 152, however, is sufficient to permit the squared stud 159 to become disengaged from the shoulder 160 on the arm 152 and to move into engagement with a shoulder 163 formed on this arm. As the pin 161 is carried by the stop arm 157, this arm and the stop arm 162 will be moved clockwise by the spring 158 the distance from the shoulder 160 to the shoulder 163.

Fig. 7 shows the parts in their normal untripped position, and it can be seen that in this position the squared stud 106 carried by the transfer arm 102 for the tens of pence bank will abut against the surface 164 of the stop arm 162 when no transfer is to be made. When, however, the parts are adjusted in the manner, and to the degree, just above described, the stop arm 162 will be so positioned, that upon the counter-clockwise movement of the differentially movable actuator in the tens of pence bank, the squared stud 106 will come into engagement with the shoulder 165 of the stop arm 162. This will permit one additonal unit to be added to the tens of pence totalizer wheel 99 (Fig. 7).

As there are twelve pence in a shilling, it is apparent, that when the pence totalizer wheels 99 and 98 register "12", "1" should be added to the units of shillings totalizer wheel 101, and the units of pence and the tens of pence wheels 98 and 99 respectively should be turned to zero. The means for accomplishing the transfer to the units of shillings totalizer wheel 101, when the tens of pence wheel 99 passes from "1" to "0" has been described above.

Figure 11:
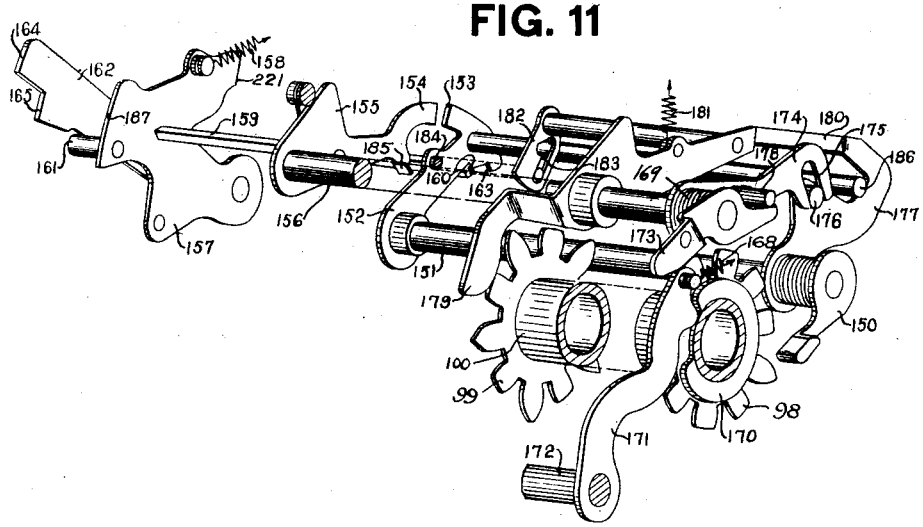
Fig. 11 is a detail extended perspective view of the transfer mechanism between the units of pence and the tens of pence totalizer wheels, and has the laterally extending shafts and pins of this mechanism lengthened sufficiently to show all the parts clearly.

The second of the above mentitoned transfers effected by the units of pence wheel will now be described. When the units of pence wheel 98 passes from "1" to "2" at a time when the tens of pence wheel 99 stands with "1" thereon, the tens of pence wheel 99 is moved one step forwardly to zero. Formed on the hub of the units of pence totalizer wheel 98 is a cam 170 (Figs. 5 and 11). This cam has a depression in the part of its periphery corresponding to the "0" and "1" teeth. Cooperating with this cam is an arm 171 pivoted on a rod 172, normally held in contact with the cam 170 by a spring 168. The opposite end of the arm 171 cooperates with the end of a lever 173 pivoted on the shaft 156. Adjacent the lever 173 is an arm 174 having a notch 175 embracing a pin 176 carried by a hook shaped arm 177 pivoted on the shaft 151. A pin 178 projects laterally from the arm 174 and extends over the rear end of the lever 173. A torsion spring 169 is wound about the shaft 156, and is anchored at one end to a pin in the lever 173, and at its opposite end to the pin 178 carried by the arm 174.

The tens of pence totalizer wheel 99 is formed with a long tooth in every other position throughout its circumference. Cooperating with the teeth of the tens of pence totalizer wheel 99 is a lever 179 (Figs. 9 and 11) pivoted on the shaft 156 and having its opposite end normally in engagement with a laterally projecting lug 180 of the arm 177. This lever 179 is held in contact with the teeth of the tens of pence totalizer wheel 99 by a spring 181 attached to said lever. The lever 179 carries, near its right hand end, a pivoted pawl 182 having a slot 183 through which a pin 184 carried by the arm 152 projects. Now assume that both the units of pence and the tens of pence totalizer wheels 98 and 99 respectively stand at "0", and that "3" for instance, is to be added to the units of pence wheel 95. As this wheel passes from "1" to "2", the arm 171 is rocked counter-clockwise by the cam 170, thereby rocking the lever 173 clockwise. Were it not for the fact that the lever 179 is normally in engagement with the lug 180 of the arm 177 the movement of the arm 171 and the lever 173, due to the cam on the units of pence wheels 98, would, through the spring 169 rock the arm 174 and cam the arm 177 in a counter-clockwise direction. However, this movement is prevented, as above noted, on this particular operation by the end of the lever 179 abutting the lug 180 of arm 177 so that the lever 173 simply places a tension on the spring 169, and the other parts mentioned are held against operation.

Now assume that the tens of pence wheel 99 still stands at "0" and the units of pence totalizer wheel 98 stands at "9", and that "3" is to be added to the units wheel. The first thing that happens is that "1" is transferred to the tens of pence totalizer wheel 99 as the units wheel 98 passes from "9" to "0", and then as the operation continues, and the arm 171 is rocked by the cam 170 as the wheel 98 passes from "1" to "2", the lever 173 is rocked and, through the spring 169, rocks the arm 174 clockwise. This movement of arm 174 through the notch 175 and the pin 176 rocks the arm 177 counter-clockwise. The counter-clockwise movement of the arm 177 is now permitted because, during the transfer of "1" into the tens of pence wheel 99, one of the long teeth of said wheel was moved underneath the lever 179, thus rocking said lever clockwise and moving the rear end thereof out of the path of the lug 180 of the member 177.

As previously described, when the trip arm 150 (Fig. 9) is actuated by the long tooth on the units of pence wheel 98, the arm 152 is rocked counter-clockwise until the head 153 thereof comes into contact with the projection 154 of the arm 155. It will also be remembered that the arm 152 carries a pin 184 projecting through the slot 183 in the pawl 182. As the arm 152 is rocked counter-clockwise, the pawl 182 is rocked clockwise about its pivot a sufficient distance to bring the lower edge thereof above a laterally projecting lug 185 of the arm 155. The arm 152 carries a laterally projecting pin 186 which lies just in front of the arm 177 so that when this arm is rocked counter-clockwise in the manner above described, the arm 152 is given an additional movement in a counter-clockwise direction. Before this occurs, however, the lever 179 will have been rocked clockwise by the high tooth on the tens of pence totalizer wheel 99, and this movement of lever 179 through the pawl 182, rocks the arm 155 clockwise to remove the projection 154 thereof from the path of the head 153 of the arm 152.

It was above described how the transfer effected by the movement of the units of pence totalizer wheel 98 from "9" to "0" permitted the squared pin 159 (Figs. 7, 8 and 11) carried by the stop arm 157 to move from engagement with the shoulder 160 into engagement with the shoulder 163. Now upon the additional movement given to the arm 152 by the arm 177, the pin 159 passes out of engagement with the shoulder 163 and entirely clears the arm 152. This permits the spring 158 to rotate the stop arm 157 and its companion arm 162 far enough to move the stop arm 162 entirely out of the path of movement of the squared stud 106 of the transfer arm 102, and permit the transfer arm to travel with its rack 76 until the squared stud comes into contact with the surface 187 of the stop arm 157. This permits two steps of movement to be imparted to the tens of pence totalizer wheel 99 in addition to what movement may be given the wheel by the rack 76. It can be seen, therefore, that the tens of pence totalizer wheel 99 will move from a "0" position to a "1" position, and farther on to another zero position, and as this movement is accomplished the long tooth will trip the transfer of the units of shillings bank and one unit will be transferred thereto in the manner previously described.

The zero stop pawl 84 in the tens of pence bank (Fig. 7) is made long enough to permit the differentially movable member to move up two steps before its latch is disconnected if no key in this bank is depressed. This is necessary as under certain conditions the differentially movable actuator must move counter-clockwise two steps when a double transfer takes place as above described. The single key 33 in this bank is placed in the "2" position to provide room for this movement.

In the example assumed when describing the transfer from the units of pence wheel 98 to the tens of pence wheel 99, the stop arm 162 (Fig. 7), is moved out of the path of the squared stud 106, so that two units are transferred to the tens of pense totalizer wheel 99. However, there is another condition under which the second transfer is effected, which sometimes exists, wherein the stop arm 162 is moved only far enough to permit one step of movement of the transfer arm 102 during an operation in which the units wheel 98 passes from "1" to "2". Such a condition exists when "2" is added to the units of pence wheel 98 when "1" is standing on the tens of pence wheel 99 prior to an operation of the machine. The control of the stop arm 162 under this condition will now be described.

With the machine at rest, having "1" standing on the tens of pence totalizer wheel 99, a long tooth is under the lever 179, (Fig. 11) and therefore, the rear end thereof is lowered out of the path of the lug 180 of the arm 177. The pawl 182 (Fig. 9) is at this time also lowered and is behind the lug 185 of the arm 155 and the stud 184 occupies the upper and widened portion of the slot 183. Now when the units of pence wheel 98 passes from "1" to "2", the cam 170 thereon rocks the lever 173 clockwise (Fig. 11) by means of the arm 171. The movement of the lever 173 is transmitted to the trip arm 152 by the pin 186, and arms 174 and 177, until the trip arm 152 is stopped by the rear end 154 of the arm 155. The movement of the lever 173 is greater than necessary to carry the trip arm 152 against the rear end 154 of the arm 155, and therefore, continued movement of the lever 173 causes the spring 169 between the lever 173 and arm 174 to be tensioned.

As before described, when the trip arm 152 is against the arm 155, the stud 159 engages the notch 163, in which position the stop arms 157 and 162 are in a position in which the squared stud 106 is stopped by the shoulder 165. This permits the tens of pence wheel 99 to receive only one step of transfer movement to carry it from "1" to "0".

*Mechanism for removing two units from units of pence totalizer wheel when a transfer is made to the units of shillings totalizer wheel*

It is believed that the necessity for the provision of the mechanism which is about to be described will best be illustrated by means of a concrete example. If the units of pence totalizer wheel 98 stands at "9", and "9" is added thereto, this totalizer wheel is rotated nine steps in an adding direction (Fig. 5). As the totalizer wheel 98 passes from "9" to "0", "1" is transferred to tens of pence totalizer wheel 99. As the rotation of the units wheel 98 continues, and it passes from "1" to "2", another unit is transferred to the tens of pence totalizer wheel 99, which then trips the transfer mechanism for the units of shillings wheel 101 and causes "1" to be added thereto in the manner above described. It is evident that the totalizer wheels now read one shilling and eight pence, whereas the correct reading, there being twelve pence in a shilling, should be one shilling and six pence. For this reason it is necessary to provide mechanism which will automatically deduct two units from the units of pence totalizer wheel 98 whenever "1" is transferred to the units of shillings totalizer wheel 101. The two units are deducted from the units of pence wheel 98 during every operation of the machine. However, during those operations in which no transfer is effected into the units of shillings wheel, the two units are immediately re-entered into the units of pence wheel 98. When the transfer into the units of shillings totalizer wheel 101 is effected, a special stop arm 209, to be later described, is set to prevent the re-entry of the two units into the wheel 98 and, therefore, the amount left on the wheels 99 and 98 will be correct. The means for accomplishing this function will now be described.

The transfer trip arm 111 appropriate to the units of shillings bank carries a pin 200 (Fig. 6) extending laterally through the bifurcated end of an arm 201 loosely mounted on a shaft 202 supported by the machine side frames. Also freely pivoted on the shaft 202, and connected to the arm 201 by a yoke 203, is an arm 204, the upper bifurcated end of which engages a pin 205 carried by an arm 206 pivoted on the shaft 110 appropriate to the units of pence bank. The arm 206 has a half-round stud 207 which normally lies just above the end of an arm 208 of a special transfer stop arm 209 which lies adjacent the stop arm 139 for the units of pence bank. The stop arm 209 has a slot 210 formed therein which normally lies in the path of movement of the squared stud 106 on the transfer arm 102 for this bank. The stop arm 209 normally tends to rock in a clockwise direction (Fig. 6) due to the action of a spring 211 attached thereto, but this movement is prevented by the engagement of the arm 208 with the half-round stud 207, above mentioned.

When "1" is transferred from the farthings wheel 97 to the units of pence wheel 98 the arms 137 and 138 are rocked counter-clockwise, (Figs. 5 and 6) thereby permitting the spring 142 to rock the stop arm 139 to move the surface 141 thereof out of the path of the stud 106. Now as the differentially movable actuator 75 for units of pence bank moves counter-clockwise on its adding stroke, the transfer arm 102 thereof remains locked to the rack 76 and adds "1" to the units of pence totalizer wheel 98, as has been previously described. In this units of pence bank the differentially movable actuator 75 is given a second clockwise and counter-clockwise movement, this movement however being only of short extent and accomplished by means which will be later described.

When the adding stroke of the units of pence differentially movable actuator 75 is finished, and a transfer has been made to the units of pence totalizer wheel 98, the squared stud 106 of the transfer arm 102 will be resting against the bottom of the slot 210 in the special stop arm 209. When "1" is added by transfer to the units of shillings totalizer wheel 101, the tripping of the arm 111 (Figs. 6 and 10) by the tens of pence wheel 99 rocks the arm 201, yoke 203 and arm 204 in a clockwise direction (Figs. 5, 6 and 10), which in turn rocks the arm 206 counter-clockwise and moves the half-round stud 207 away from above the end of the arm 208 of the stop arm 209, thereby permitting the spring 211 to rock this stop arm 209 clockwise. Just prior to the transfer of "1" into the shillings wheel 101, the units of pence actuator 75 (Fig. 5) is moved clockwise by a cam 232 (Fig. 12) to be later described. This movement of said actuator moves its associated transfer arm 102, thus moving the square stud 106 out of the slot 210, to permit the spring 211 to rock the stop arm 209 as above stated. The movement of the stop arm is limited by a flattened stud 212 carried on an upwardly extending portion 213 of the arm 138. When the arms 137 and 138 are rocked as above described the flattened stud 212 is moved into the path of a surface 214 of the stop arm 209, thereby limiting the clockwise movement of this arm and positioning a shoulder 215 thereon into the path of movement of the squared stud 106. Now, as the differentially movable actuator 75 is moved counter-clockwise to normal position, thus completing its special short movement given it by the cam 232, the squared stud 106 is stopped by the shoulder 215 of the stop arm 209. The transfer arm 102 is held and the differentially movable actuator completes its return without it. From the above description it can be seen that the clockwise movement of the units of pence actuator 75 just above described subtracts or removes two units from the units of pence wheel 98, because said wheel remains in engagement with the actuator during the clockwise movement given to said actuator by the special cam 232.

Under the conditions stated above, when the the units of pence actuator 75 is moved counter-clockwise, the two units just subtracted from the units of pence wheel 98 are not re-entered therein, even though said wheel 98 remains in engagement with its actuator 75, because the transfer arm 102 is stopped two steps or two tooth spaces short of normal by the square stud 106 thereon contacting the shoulder 215 of the stop arm 209.

If there is no transfer from the farthings wheel 97 to the units of pence wheel 98 the transfer trip arm 137 and the arm 138 (Figs. 5 and 6) remain in their normal positions, then the stop arm 139 is in position so that the surface 141 thereof stops the transfer arm 102 one tooth space short of its full transfer movement. If, with the parts in such positions, one unit is transferred to the units of shillings wheel 101, and the mechanism comprising arm 201, yoke 203, arm 204 and arm 206 is moved as above described, the special stop arm 209, when it rocks clockwise under the influence of the spring 211, moves until a surface 216 thereon comes into contact with the flattened stud 212. This positions the stop arm 209 so that a surface 217 thereof moves into the path of the squared stud 106 on the units of pence transfer arm 102 when the differentially movable actuator 75 receives its second clockwise or special movement and the units of pence totalizer wheel 98 is rotated backwardly two steps as before. Now, upon the counter-clockwise movement of said actuator, the transfer arm 102 is held, due to the engagement of the squared stud 106 thereof with the surface 217 and the differentially movable actuator returns to its home position without it and the two units subtracted from said wheel 98 are not re-entered therein.

It can be seen from the above that no matter under what conditions the transfer from the farthings wheel 97 to the units of pence totalizer wheel 98 is made, two units are always deducted from the units of pence wheel whenever "1" is transferred into the units of shillings wheel 101, which transfer, as previously described, is caused when the transfer trip arm 111 appropriate to the units of shillings bank is tripped by the tens of pence wheel 99.

When no transfer is made into the units of shillings wheel 101, the special stop arm 209 is not tripped, and therefore, neither of the shoulders 215 or 217 will move into the path of the squared stud 106. Under this condition two units are subtracted from the units of pence wheel 98, upon the special clockwise movement of the actuator 75 as before. However, during the counter-clockwise movement of this units of pence actuator 75, the transfer arm 102 remains locked to the rack 76, and therefore, the two units which were deducted, are re-entered into the units of pence totalizer wheel 98.

It can be seen also that when the units of pence totalizer wheel 98 passes the transfer trip arm 150 (Figs. 7, 8, 9 and 11) during the second excursion, which is for deducting the two units from this wheel 98 as just described, the long tooth thereon contacts with the transfer trip arm 150 and rocks the same and its rigid arm 152 (Figs. 7 and 11) in a counter-clockwise direction in the same manner as it does during the first or regular movement of the wheel 98. In order to prevent this tripping movement of the arm 150 from effecting a transfer in the tens of pence wheel 99 during this second excursion of the units of pence totalizer wheel 98 which would cause an incorrect result to be registered, the following mechanism is provided. Cooperating with the transfer stop arm 157 (Fig. 7) for the tens of pence bank is a three armed spider 220 loose on the hub of the differentially movable actuator 75.

Since the specific description of the totalizers and transfer mechanism is being applied to the front totalizer line, the lower arm only of the three-armed spider 220 need be considered here. This arm normally contacts a surface 221 of the stop arm 157. The spider 220 also carries a pin 222 normally engaged by the upper end of a lever 223 pivoted to the differential unit supporting frame. At its lower end the lever 223 carries a roller 224 cooperating with the periphery of a cam 225 fast on the main drive shaft 65. While the roller 224 rides on the high portion of the cam, as shown in Fig. 7, it is evident that the lever 223 and spider 220 are held against movement, and thereby preventing movement of the transfer stop arm 157, even though the transfer trip arms 150 and 152 are tripped by a long tooth of the wheel 98. As the cam 225 rotates the roller 224 contacts a low portion of the periphery. This low portion is so located that during the regular adding stroke of the differentially movable member the roller cooperates therewith thus permitting the stop arm 157 of this bank to move in a clockwise direction to its tripped position so that a transfer into the tens of pence wheel 99 may be accomplished. As soon as the roller 224 again passes onto the high portion of the cam the transfer stop arm 157 is locked against movement. When two units are transferred to the tens of pence totalizer wheel 99, the squared stud 106 of this bank will have traveled down and stopped against the surface 187 (Figs. 7 and 8) of stop arm 157. With the parts in this position, when the stop arm 157 is restored it is impossible to move the stop arm 162, as the stud 106 is now in its path. This is the reason that the spring connection between this arm 162 and arm 157 is provided. Arm 157 can be restored to untripped position without affecting arm 162. However the spring 166 connecting these arms is tensioned and, when, on the next operation the stud 106 is raised out of the path of arm 162 the spring 166 returns said arms to its normal position abutting the pin 161.

Because of the fact that it is necessary to provide the cam 225 and lever 223, above mentioned, it is necessary to omit, in the units of pence, bank, the pair of cams for driving the differential mechanism thereof. This units of pence differential mechanism may be driven from the differential driving cams of either the farthing bank or the clerks initial bank. As illustrated said units of pence differential mechanism is driven by novel means connected to the clerks' bank. The driving segment 77 (Fig. 12), for the units of pence bank is mounted on a hub 226 (Fig. 12), which is in turn fast on a shaft 227 extending between the units of pence bank and the bank containing the clerks' initial keys, which is the second bank to the right of the units of pence bank. The driving segment 77 for the clerks' initial differential mechanism is also fast on a hub 228 similar to the hub 226, and this hub is pinned to the shaft 227. The segment 77 for the clerks' initial bank is driven by one of the Y-shaped levers 78 which are old and well known in this art, and the movement given to the segment 77 for the clerks' initial bank is transmitted through the shaft 227 to the segment 77 for the units of pence bank so that these two parts move in unison. The segment for the units of pence bank has a link 229 pivoted thereto, which at its opposite end is pivoted to a triangularly shaped lever 230 loosely pivoted to the differential supporting frame. This lever 230 carries a roller 231 adapted to cooperate with the beam of the units of pence bank (not shown, but identical with the beam 186 in the farthings bank Fig. 3) and operate it in a manner which is well known in the art. The driving segment (not shown) for the farthings bank floats on the shaft 227, and is driven by its own appropriate cams (not shown), and the movement of the clerks' initial and units of pence segments 77 has no effect thereon.

Figure 12:
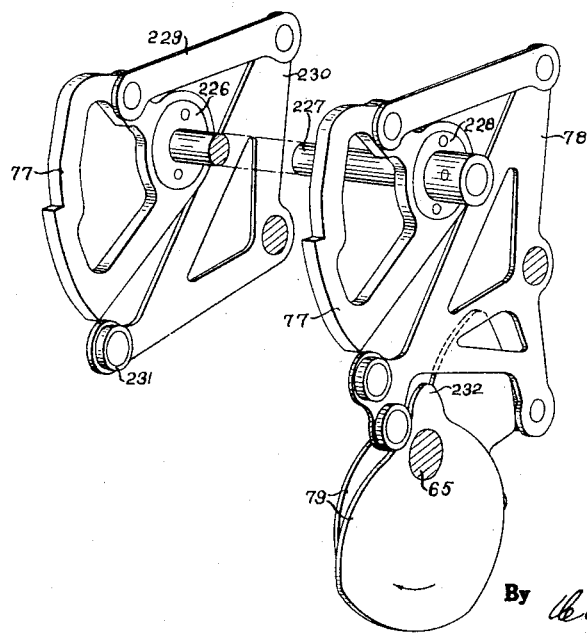
Fig. 12 is a perspective view of the mechanism for driving the units of pence differential mechanism through the transaction bank driving mechanism.

It will be noted from Fig. 12 that the pair of cams 79 appropriate to the clerks' initial bank have an extra high portion or cam 232 which is for the purpose of giving the units of pence differential mechanism its second special short excursion in the manner above described. The fact that the clerks' initial bank also receives this special partial movement is of no consequence, as it is merely an idle movement in this bank.

Figure 2:
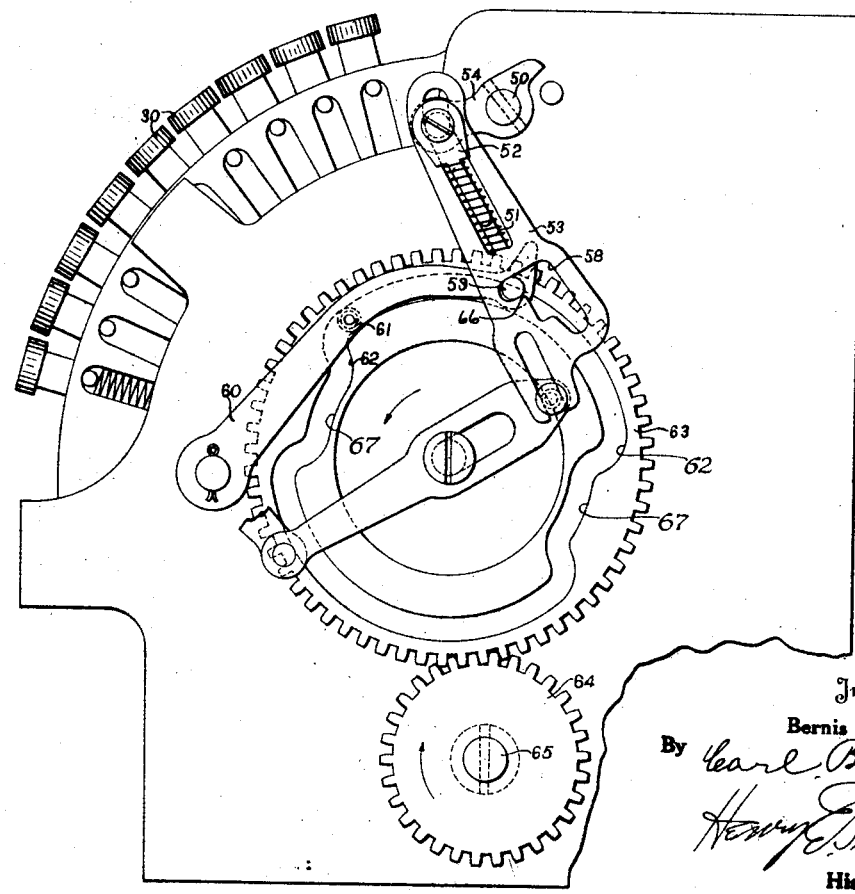
Fig. 2 is a right hand side elevation of the machine.

During this second upward movement of the units of pence differential it is necessary to rock the zero stop pawls 84 out of operative positions, as otherwise, this differential would be stopped in the zero position. This function is accomplished as follows: It will be remembered that the cam groove 62 in gear 63 causes the shaft 50 to be rocked counter-clockwise (Fig. 2). This occurs just before the second upward movement of the units of pence differential and the cam groove is so shaped that the shaft 50 is held in its moved position until just before the end of the operation.

It can be seen from Figs. 3 and 5 that when the shaft 50 is rocked counter-clockwise the rod 55 carried by arms 56 engages the tails 57 of the detents 43 and moves said detents downwardly. The arms 45, which support the lower ends of the detents, have toes 240, each of which cooperates with a pin 241 carried by an arm 242 fast on a shaft 243. Each of these shafts carries one of the zero stop pawls 84. When the detents 43 are lowered, as above described, the toes 240 of arms 45 rock the arms 242, shafts 243 and stop pawls 84 counter-clockwise to their ineffective positions, thereby permitting the second upward movement of the units of pence differential. After the neutral portion 67 (Fig. 2) passes the roller 61, the remaining cam portion 62 rocks the arm 60 and shaft 50 to permit the detents 43 to be restored to normal, thus allowing the springs 46 to restore the zero stop pawls to normal positions.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. The combination of a totalizer involving a plurality of totalizer elements, transfer means, means for controlling the transfer means to transfer from a lower to a higher order totalizer element, means controlled by said lower and higher order elements for controlling said transfer mechanism to actuate said higher order element to cause a transfer to be made in the next higher element, and means controlled as an incident to a transfer into said latter higher order element to deduct an amount from the lowest order element.

2. The combination of a totalizer involving a plurality of totalizer elements, a transfer mechanism for each element, and means controlled by a plurality of said elements for operating a higher order element to cause a transfer to be made into the next higher order element and to cause an amount to be deducted from the lowest order of said plurality of elements.

3. In a machine of the class described, the combination of a totalizer comprising a plurality of wheels arranged for English currency, differentially movable actuators therefor, means for transferring from the units of pence wheel to the tens of pence wheel, means for transferring from the tens of pence wheel to the units of shillings wheel, and means for subtracting two units from the units of pence wheel when a certain transfer is made to the units of shillings wheel.

4. In a machine of the class described, the combination of a totalizer, actuating mechanism therefor adapted to receive an excursion, manipulative mechanism for controlling said actuating mechanism, and a cam adapted to give said actuating mechanism an excursion in addition to its regular excursion in order to subtract an invariable amount from one of the elements of said totalizer.

5. In a machine of the class described, the combination of a totalizer, differentially movable actuators therefor, mechanism for transferring from lower to higher denominations, and means under control of one of the totalizer elements for causing an amount to be subtracted automatically from said totalizer element when a transfer to a certain other element is effected.

6. In a machine of the class described, the combination of a differential mechanism, totalizer elements, means for operating the differential mechanism to add and subtract from one of said elements during a single cycle of operation of the machine and means controlled by another of said elements to determine the effectivity of said differential mechanism.

7. In a machine of the class described, the combination of totalizer elements, a differential mechanism, means for operating the differential to add variable amounts and for operating the differential a second time to deduct constant amounts from one of said elements during single operations of the machine, and means under control of another one of said elements for determining the effectivity of the differential during the second time it is moved.

8. In a machine of the class described, the combination of totalizer elements, differential mechanisms therefor, means for controlling the differential mechanisms to add amounts into said totalizer elements, and means controlled by one of said elements for controlling the differential mechanism for another element to deduct an amount from said other element.

9. In a machine of the class described, the combination of a totalizer, differential means for entering amounts therein, and means under control of said totalizer for causing an amount to be deducted from an element of the totalizer to correct the accumulated total.

10. In a machine of the class described, the combination of a totalizer, differential and transfer mechanisms for operating the totalizer, and means controlled by one of said transfer mechanisms for controlling a subtractive movement of a totalizer element.

11. In a machine of the class described, the combination of a totalizer, differential and transfer mechanisms for operating the totalizer, and means controlled by one transfer mechanism for controlling another transfer mechanism to deduct an amount from its totalizer wheel.

12. In a machine of the class described, a totalizer, differential mechanism for adding amounts on said totalizer, transfer mechanisms, a restoring member for each transfer mechanism, a device coacting with each of said members to operate the same subsequently to an adding operation, and means for operating a certain restoring member to restore its transfer mechanism after the inception and prior to completion of an adding operation.

13. In a machine of the class described, a totalizer, differential mechanism for adding amounts on said totalizer, transfer mechanisms, a restoring member for each transfer mechanism, a device for each member to operate the same subsequently to an adding operation, and means operated prior to any of said devices to operate one of them to restore one of said transfer mechanisms and maintain it restored during the latter part of an adding operation of the machine.

14. In a machine of the class described, a totalizer involving a plurality of elements, differential mechanism for adding amounts in said totalizer, transfer mechanisms, tripping means therefor, and means for preventing tripping of one of said transfer mechanisms during the latter part of the movement of the totalizer element controlling said transfer mechanism.

15. In a machine of the class described, the combination of a totalizer involving a plurality of elements, a transfer element under control of one of said totalizer elements for causing a regular transfer into the element of the next higher order, and means operable after a regular transfer operation for locking said transfer element against a second operation under the influence of its controlling totalizer element.

16. In a machine of the class described, the combination of a movable transfer rack portion, means for controlling its movement to enter one into its totalizer element and another means to control the movement of said transfer rack portion to enter more than one unit into its totalizer element.

17. In a machine of the class described, the combination of a totalizer element, a movable rack portion, stopping means therefor comprising means for arresting said portion in one position when no transfer takes place, in another position when a single unit of movement is transferred, and in still another position when two units of movement are given to its cooperating totalizer element, and means included in said totalizer for controlling said stopping means.

18. In a machine of the class described, a movable transfer rack, stopping means therefor comprising relatively movable pivoted members, a shoulder on each of said members cooperable with said rack for controlling the amounts entered by transfer, and means cooperating with said members for controlling the positions of said members.

19. In a machine of the class described, a movable transfer rack, stopping means therefor comprising relatively movable pivoted members, a shoulder on each of said members cooperable with said rack for controlling the amounts entered by transfer, a connection between said members, and means cooperating with one of said members for controlling the position of said members.

20. In a machine of the class described, a movable transfer rack, stopping means therefor comprising relatively movable pivoted members, a shoulder on each of said members cooperable with said rack for controlling the amounts entered by transfer, a connection between said members for moving one from the other positively in one direction for controlling transfers and non-positively in the opposite direction into home position, and means for moving said members into home position.

21. In a machine of the class described, the combination of a differential mechanism, driving means for said differential mechanism performing two reciprocatory movements during each operation of the machine, a bank of keys for controlling said differential mechanism when moved by said driving means during one of its reciprocatory movements, a zero stop pawl adapted to be moved into ineffective position by said keys, and means for moving said zero stop pawl into ineffective position to permit the differential mechanism to be wholly under the control of the driving means during its second reciprocatory movement.

22. In a machine of the class described, the combination of a totalizer element, a differential mechanism, a bank of keys controlling said mechanism, a zero stop member controlled by any one of said keys when depressed for adding, means for deducting an amount from said element, and another means for controlling said zero stop member when an amount is deducted from said element.

23. In a machine of the class described, a totalizer element, a differential mechanism therefor, means for moving said mechanism twice during each adding operation once to add and once to deduct, a zero stop pawl, and means for moving said pawl into ineffective position and for maintaining it in such position during movement of said mechanism deducting an amount from said element.

24. In a machine of the class described, a totalizer element, a differential mechanism therefor, means for moving said mechanism twice during each adding operation once to add and once to deduct, a zero stop pawl, keys for moving said pawl into ineffective position, and means for releasing said pawl from control of said keys toward the end of the first movement and for maintaining said pawl in ineffective position after relieved from the control of keys as they were released.

25. In a machine of the class described, the combination of a totalizer element; an actuator therefor; driving means for the actuator adapted to drive the actuator two excursions, one for adding amounts on the element and one for subtracting therefrom; and transfer means for preventing the amount substracted from being reentered into the element.

26. In a machine of the class described, the combination of totalizer elements; an actuator for one of said elements; driving means for the actuator adapted to give the actuator two excursions for each operation of the machine, one for adding amounts on the said one element and one for subtracting therefrom; and means controlled by another one of said elements for preventing the amounts subtracted from being reentered into the element.

27. In a machine of the class described, the combination of a totalizer element; an actuator therefor; driving means for the actuator adapted to drive the actuator through two excursions during each operation of the machine, one for adding amounts on one of the elements and one for subtracting therefrom; a lower order totalizer element; a transfer member for adding "one" into the first element from the lower order element; and a stop member adapted to control the transfer member for preventing reentry of the amounts subtracted from the element.

28. In a machine of the class described, the combination of a totalizer element; an actuator therefor; driving means for the actuator adapted to drive the actuator through two excursions during each operation of the machine, one excursion to add an amount on said totalizer element, and one excursion to subtract an amount therefrom; two higher order totalizer elements; transfer mechanism associated with each of said totalizer elements; a lower order totalizer element; transfer mechanism for adding "one" into the first mentioned totalizer element from said lower order totalizer element; a stop member having two positions of adjustment, one position controlled by the last mentioned transfer mechanism and one position controlled by the transfer mechanism intermediate the two higher order totalizer elements; and means on the transfer mechanism between the lower order totalizer element and the first mentioned totalizer element, said means adapted to contact with said stop member when said stop member is in either of its two positions to prevent the re-entry of the amount subtracted from the first-mentioned totalizer element.

29. In a machine of the class described, the combination of a totalizer element; an actuator therefor; driving means for the actuator to drive the actuator through two excursions during each operation of the machine, one excursion to add an amount on said element and one excursion to subtract an amount therefrom; two higher order totalizer elements; transfer means associated with each of said totalizer elements; a lower order totalizer element; transfer mechanism to add "one" into the first-mentioned totalizer element from said lower order totalizer element; and a stop member adapted to be moved into one position by the transfer mechanism between the said two higher order totalizer elements to prevent the re-entry of the amount subtracted from the first-mentioned totalizer element, and adapted to be adjusted into another position to prevent the re-entry of the amount subtracted from the first-mentioned totalizer element when no transfer is made from said lower order totalizer element to said first-mentioned totalizer element.

30. In a machine of the class described, the combination of a totalizer element; an actuator therefor; driving means for the actuator adapted to drive the actuator on two excursions during each operation of the machine, one for adding an amount on said element and one for subtracting an amount therefrom; a lower order totalizer element; a transfer member for adding "one" into the first element from the lower order element; a stop member; a shoulder on said stop member for controlling the transfer member to prevent re-entry of the amount subtracted after "one" has been added from said lower order element; and another shoulder on said stop member for preventing re-entry of the amount subtracted when no transfer has been made from said lower order element.

31. In a machine of the class described, the combination of totalizer elements; an actuator for one of said elements, driving means for the actuator adapted to drive the actuator on two excursions for each operation of the machine, the first excursion being for adding amounts into one of the totalizer elements and the second excursion for subtracting therefrom; transfer means for causing "one" to be added into the next higher order element when the said element passes from "zero" to "nine" during the adding movement; and means for preventing operation of the transfer means during the subtracting movement of the element.

32. In a machine of the class described, the combination of totalizer elements; an actuator for one of said elements; driving means for the actuator adapted to drive the actuator on two excursions for each operation of the machine, the first excursion for adding amounts into one of the totalizer elements and the second excursion for subtracting therefrom; a transfer element for adding "one" into the next higher order element when said element passes from "nine" to "zero"; a tripping means for said transfer element; and means for preventing operation of the transfer element when the tripping means is operated during the subtracting movement of said element.

33. In a machine of the class described, the combination of totalizer elements; an actuator for one of said elements; driving means for the actuator adapted to drive said actuator twice for each operation of the machine, once for adding and once for subtracting; a transfer element; tripping means for the element for causing "one" to be added from said element to a higher order element; and means for restoring the transfer elements before the subtracting movement of the actuator begins.

34. In a machine of the class described, the combination of totalizer elements; an actuator for one of said elements; driving means for the actuator, adapted to drive said actuator twice for each operation of the machine, once for adding and once for subtracting; a transfer element; tripping means for the element for causing "one" to be added from said one element to the higher order element, means for restoring the transfer element before the subtracting movement of the actuator; and means for restoring the transfer element and for preventing its being tripped during the subtracting movement of the actuator.

35. A pivoted differential actuator including a plurality of racks mounted in a common plane, all racks moving as a unit, and a plurality of transfer racks having supports mounted in said common plane and on a common bearing to swing around the differential actuator pivot either simultaneously or dissimultaneously with the first-named racks.

36. The combination of a pivoted differential actuator; and a support therefor; said actuator including a plurality of racks mounted on a common disk and all in the same plane; and a plurality of transfer racks, the inner ends of the transfer racks each having an arcuate foot, all feet being mounted in the same plane as the first-named racks and having their arcuate surfaces arranged concentrically with the axis of said support in such manner as to render them relatively movable around the axis.

37. The combination of a pivoted differential actuator including a plurality of racks all mounted in the same plane and on a common member, and a plurality of transfer racks, each rack having a leg with a concave foot, the transfer racks and their feet all being in the same plane as the first-named racks, and arranged to render the transfer racks relatively movable around a common axis; and a common bearing for all of the arcuate feet.

38. The combination of a lower order totalizer element; a higher order totalizer element; a transfer segment to move the higher order element one or two steps in the adding direction; a stop to determine when said element is to receive one step of movement; another stop to determine when said element is to receive two steps of movement; and means under control of the higher and lower order elements to adjust the stops to determine whether the higher order element is to move one or two steps in the adding direction.

39. The combination of a lower order totalizer element; a higher order totalizer element; a transfer segment controlled by the lower and higher order elements to move the higher order element one or two steps; stops for the segment to determine the extent of movement thereof; an arm to control the positions of the stops; means on the lower order totalizer element to actuate said arm; and a shoulder on the arm to limit the movement of the stops to control the segments to move the higher order element one step.

40. The combination of a lower order totalizer element; a higher order totalizer element; a transfer segment controlled by the lower and higher order elements to move the higher order element one or two steps; stops for the segment to determine the differential extents of movement thereof; an arm to control the positions of the stops, said arm movable to a plurality of positions; a movable device normally in position to stop the arm in its first position of adjustment; means on the lower order totalizer element to actuate said arm; and a shoulder on the arm to limit the movement of the stops to control the segment to move the higher order element one step.

41. The combination of a lower order totalizer element; a higher order totalizer element; a transfer segment controlled by the lower and higher order elements to move the higher order element one or two steps; stops for the segment to determine the differential extents of movement thereof; an arm to control the positions of the stops, said arm movable to a plurality of positions; a movable device normally in position to stop the arm in its first position of adjustment; means on the lower order totalizer element to actuate said arm; a shoulder on the arm to limit the movement of the stops to control the segment to move the higher order element one step; means controlled by the higher order element to move the device out of its normal position and out of the path of movement of the arm; and means to shift the arm into its second position of adjustment to control the stops to move into positions to render the segment operable to turn the higher order element two steps.

42. The combination of a lower order totalizer element; a higher order totalizer element; a transfer segment controlled by the lower and higher order elements to move the higher order element one or two steps; stops for the segment to determine the movement thereof; an arm to control the positions of the stops, said arm movable to a plurality of positions; a movable device normally in position to stop the arm in its first position of adjustment; means on the lower order totalizer element to actuate said arm; a shoulder on the arm to limit the movement of the stops to control the segment to move the higher order element one step; a lever actuated by the higher order element; a coupling member to connect said lever with the movable device, to move the device out of the path of the arm when the lever is actuated by the higher order element; and means to move the arm into its second position of adjustment to control the stops to move into positions to render the segment operable to move the higher order element two steps.

43. In a totalizer; the combination of a plurality of totalizer elements; a transfer segment to add into a higher order element; stop means to control the differential extents of movement of the segment; an arm to control the postion of the stop means; a movable device to determine the positions of the arm; means controlled by a totalizer element of lower order to shift the arm, whereby the segment adds "one" to the higher order element; a lever actuated by the higher order element; a coupling pawl to connect the lever and the movable device to shift the device out of the path of the arm; connections between the arm and the coupling pawl to shift the coupling pawl into connecting position as the arm is shifted; and means on the lower order element to shift the arm an additional extent, after the movable device is shifted out of the path of the arm, to set the stop means so that the segment adds an additional "one" on the higher order element.

44. In a totalizer; the combination of a plurality of totalizer elements; a transfer segment to add into the higher order element; stop means to control the differential extents of movement of the segment; an arm to control the positions of the stop means; a movable device to determine the position of the arm; means controlled by a totalizer element of lower order to shift the arm into position so that the segment adds "one" to the higher order element; a lever actuated by the higher order element; a coupling pawl to connect the lever and the movable device to shift the device out of the path of the arm; connections between the arm and the coupling pawl to shift the coupling pawl into connecting position as the arm is moved into one of its positions; a cam on the lower order element; and means actuated by said cam to shift the arm an additional extent after the movable device is shifted out of the path of the arm, to set the stop means into positions whereby the segment adds an additional "one" on the higher order element.

45. In a totalizer; the combination of a plurality of totalizer elements; a transfer segment to add into the higher order element; stop means to control the differential extents of movement of the segment; an arm to control the positions of the stop means; a movable device to determine the position of the arm; means controlled by the totalizer element of lower order to shift the arm into position to render the segment operable to add "one" into the higher order element; a lever actuated by the higher order element; a coupling pawl to connect the lever and the movable device to shift the latter out of the path of the arm; connections between the arm and the coupling pawl to shift the coupling pawl into connecting position as the arm is moved into tripped position; a cam on the lower order element; a member actuated by said cam; and connections between said member and the arm whereby the arm is shifted an additional extent, after the movable device is shifted out of the path of the arm, to set the stop means into positions to render the segment operable to add "one" on the higher order element.

46. In a totalizer; the combination of a plurality of totalizer elements; a transfer segment to add into a higher order element; stop means to control the differential extents of movement of the segment; an arm to control the positions of the stop means; a movable device to determine the position of the arm; means controlled by a totalizer element of lower order to shift the arm, thereby tripping the stop means to move into position to render the segment operable to add "one" into the higher order element; a lever actuated by the higher order element; a coupling pawl to connect the lever and the movable device to shift the latter out of the path of the arm; connections between the arm and the coupling pawl to shift the coupling pawl into connecting position as the arm is moved into tripped position; a cam on the lower order element; a member, normally restrained by the lever, operable by said cam after the lever is actuated by the higher order element; and connections between the member and the arm to shift the arm an additional step to set the stop means in positions to render the segment operable to add an additional "one" into the higher order element.

47. In a totalizer; the combination of a plurality of totalizer elements; a transfer segment to add into a higher order element; stop means to control the differential extents of movement of the segment; an arm to control the positions of the stop means; a movable device to determine the position of the arm; means controlled by a totalizer element of lower order to shift the arm into position to render the segment effective to add "one" into the higher order element; a lever actuated by the higher order element; a coupling pawl to connect the lever and the movable device to shift the latter out of the path of the arm; connections between the arm and the coupling pawl to shift the coupling pawl into connecting position as the arm is shifted; a cam on the lower order element; a member normally restrained by the lever; driving means between the member and cam to actuate the member after the lever is actuated by the higher order element, said driving means including a flexible connection whereby the cam is effective when the member is restrained by the lever; and connections between the member and the arm to shift the arm an additional step to set the stop means in positions to render the segment effective to add an additional "one" on the higher order element.

48. In a totalizer, the combination of a plurality of totalizer elements; a transfer segment to add into a higher order element; stop means to control the differential extents of movement of the segment, an arm to control the positions of the stop means; a movable device to determine the position of the arm; means controlled by a totalizer element of lower order to shift the arm into position to control the segment to add "one" into the higher order element, said higher order element having alternating long and short teeth; a lever actuated by the alternating long teeth; a member actuated by the lower order element; a flange on the member to contact the lever when the latter is in contact with a short tooth of the higher order element; and connections between the member and the arm to shift the arm an additional step when an alternating long tooth moves the lever out of the path of said flange, to set the stop means to control the segment to add an additional "one" on the higher order element.

49. The combination of a lower order totalizer element; a higher order totalizer element; a transfer segment to move the higher order element one or more steps in the adding direction; a stop to determine when said higher order element is to be advanced one step; another stop to determine when the said higher order element is to be advanced more than one step; means under control of both higher and lower order elements to adjust the stops to determine whether the higher order element is to be moved one, or more than one, step; a transfer segment for the lower order element; and means actuated by the higher order element, when the latter is advanced more than one step, to control the transfer segment of the lower order element to subtract a certain amount from said lower order element.

50. The combination of a lower order totalizer element; a higher order totalizer element; a transfer segment to move the higher order element one or more steps in the adding direction; a stop to determine when the higher order element is to move one step; another stop to determine when the higher order element is to move more than one step; means under control of both higher and lower order elements to adjust the stops to determine whether the higher order element is to move one, or more than one, step; a transfer segment for the lower order element adapted to subtract a certain amount from the lower order element upon each operation of the machine; and means controlled by the higher order element when the latter is advanced more than one step to prevent the re-entry of the subtracted amount into the lower order element.

51. The combination of a lower order totalizer element; a higher order totalizer element; a transfer segment to move the higher order element one or more steps in the adding direction; a stop to determine when the transfer segment is to advance the higher order element one step; another stop to determine when the transfer element is to advance the higher order element more than one step; means under control of both higher and lower order elements to adjust the stops to determine whether the higher order element is to be advanced one, or more than one, step; a segment for the lower order element adapted to subtract a constant amount from the lower order element; stop means to determine the movement of the last-named segment; means to determine the position of the stop means; and means actuated by the totalizer element of higher order to adjust the determining means, whereby the stop means is moved into position to prevent re-entry of the subtracted amount.

52. The combination of a lower order totalizer element; a higher order totalizer element; a transfer segment to advance the higher order element one or more steps; a stop to determine when the transfer segment is to advance the higher order element one step; another stop to determine when the transfer segment is to advance the higher order element more than one step; means under control of both higher and lower order elements to adjust the stops to determine whether the higher order element is to be advanced one, or more than one, step; a segment for the lower order element adapted to subtract a constant amount from the lower order element; a spring-actuated stop means to control the movement of the last-named segment; a restraining means to normally maintain the stop means in position to control the reentry of the constant amount into the lower order element; and connections actuated by the higher order element to release the stop means and thus prevent the reentry of the constant amount.

53. The combination of a plurality of totalizer elements; transfer means for each of said elements; means to trip the transfer means associated with the totalizer element of one order to advance such element one step when tripping the transfer means for an adjacent element; a plurality of means to trip the transfer mechanism for an element of another order, one of said means being effective when the controlling element passes through "zero", and the other of said means being effective when the controlling element passes through another digit, at a time when the element into which the transfer is made is standing at a predetermined position; and means to subtract a constant amount from the controlling element when the last-named transfer is effected.

54. The combination of a plurality of totalizer elements; transfer means for each of said elements; means to trip the transfer means associated with the totalizer element of one order to advance such element one step, when the transfer means for an adjacent element is tripped; means to control the transfer means for a third element to effect the addition of more than "one" therein; and means to subtract a constant amount from said adjacent element when more than "one" is added into said third-named element.

55. The combination of a plurality of totalizer elements; transfer mechanism for each of said elements; means actuated by the lowest order element to trip the transfer mechanism for an intermediate order element; connections between the transfer mechanism for the lowest order element and the transfer mechanism for the intermediate order element to trip the transfer mechanism for the lowest order element to add "one" in both the lowest and intermediate order elements; means on said intermediate order element to trip the transfer for a higher order element to control the transfer mechanism for such higher order element to add an additional "one" thereon when the intermediate element passes through a certain digit at a time when the higher order element stands at a predetermined position; and means to subtract a constant amount from the intermediate order element when the additional "one" is added on the higher order element.

56. The combination with a plurality of totalizer elements; transfer segments therefor; and tripping devices for each segment; of means on the lower order element to actuate the tripping devices for the lower and higher order elements to release the segments for said orders to add "one" in each of said elements; a shouldered stop to control the movement of one transfer segment; and a separately mounted stop to control the movement of the other segment.

In testimony whereof I affix my signature.
BERNIS M. SHIPLEY.